(12) United States Patent
Astigarraga et al.

(10) Patent No.: US 10,015,084 B2
(45) Date of Patent: Jul. 3, 2018

(54) STORAGE AREA NETWORK PATH MANAGEMENT

(75) Inventors: Tara Astigarraga, Tucson, AZ (US);
Louie A. Dickens, Tucson, AZ (US);
Cam-Thuy Do, Sunnyvale, CA (US);
Laurence W. Holley, Tucson, AZ (US);
Michael E. Starling, Tucson, AZ (US);
Daniel J. Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 802 days.

(21) Appl. No.: 12/854,055

(22) Filed: Aug. 10, 2010

(65) Prior Publication Data

US 2012/0039331 A1   Feb. 16, 2012

(51) Int. Cl.
*H04L 12/717* (2013.01)
*H04L 12/721* (2013.01)
*H04L 12/707* (2013.01)

(52) U.S. Cl.
CPC .............. *H04L 45/42* (2013.01); *H04L 45/26* (2013.01); *H04L 45/24* (2013.01)

(58) Field of Classification Search
USPC .... 370/216, 225, 227, 228, 241.1, 242, 244, 370/248, 389; 709/238, 239; 710/38
See application file for complete search history.

(56) References Cited

U.S. PATENT DOCUMENTS

| | | | |
|---|---|---|---|
| 6,115,361 A * | 9/2000 | Fredericks | H04L 12/6418 370/242 |
| 6,732,233 B2 | 5/2004 | Smith | |
| 7,043,663 B1 | 5/2006 | Pittelkow et al. | |
| 7,058,844 B2 | 6/2006 | Wiley et al. | |
| 7,127,633 B1 | 10/2006 | Olson et al. | |
| 7,307,948 B2 * | 12/2007 | Infante et al. | 370/225 |
| 7,339,896 B2 * | 3/2008 | Ain et al. | 370/252 |
| 7,668,981 B1 * | 2/2010 | Nagineni et al. | 710/38 |
| 7,937,481 B1 * | 5/2011 | Sandstrom et al. | 709/229 |
| 8,051,335 B1 * | 11/2011 | Reimers et al. | 714/43 |
| 8,224,942 B1 * | 7/2012 | Presotto et al. | 709/223 |
| 2003/0095501 A1 * | 5/2003 | Hofner et al. | 370/225 |
| 2003/0112746 A1 * | 6/2003 | Schaller et al. | 370/216 |

(Continued)

FOREIGN PATENT DOCUMENTS

| | | |
|---|---|---|
| EP | 1 993 230 A1 | 11/2008 |
| JP | 2005115581 | 4/2005 |
| WO | 98/00939 | 1/1998 |

OTHER PUBLICATIONS

"Enhance SAN Reliability with Emulex Cool-running 8Gb/s Fibre Channel HBAs", White Paper, Emulex, 2009.

*Primary Examiner* — Saba Tsegaye
(74) *Attorney, Agent, or Firm* — Kunzler, PC

(57) ABSTRACT

A path selection module selects at least two fiber channel paths between a fiber channel host and a fiber channel destination. A trace route module performs one or more fiber channel trace route procedures for each of the at least two fiber channel paths. The trace route module provides a set of fiber channel links between the fiber channel host and the fiber channel destination for each of the at least two fiber channel paths. A record registration module registers with one or more event servers to receive link incident records for the fiber channel links in the sets of fiber channel links.

11 Claims, 5 Drawing Sheets

(56) References Cited

U.S. PATENT DOCUMENTS

| | | | |
|---|---|---|---|
| 2003/0187987 A1 | 10/2003 | Messick et al. | |
| 2003/0191992 A1 | 10/2003 | Kaminsky et al. | |
| 2005/0120259 A1* | 6/2005 | Aoki | 714/5 |
| 2006/0092950 A1* | 5/2006 | Arregoces et al. | 370/396 |
| 2006/0107089 A1* | 5/2006 | Jansz et al. | 714/5 |
| 2007/0248020 A1 | 10/2007 | Hoque et al. | |
| 2008/0250042 A1 | 10/2008 | Mopur et al. | |
| 2010/0115329 A1 | 5/2010 | Tanaka et al. | |
| 2011/0267952 A1* | 11/2011 | Ko et al. | 370/237 |
| 2012/0026870 A1* | 2/2012 | Challa et al. | 370/230 |

\* cited by examiner

STORAGE AREA NETWORK PATH MANAGEMENT

FIELD

The subject matter disclosed herein relates to storage area network paths and more particularly relates to detecting and managing storage area network paths.

BACKGROUND

Description of the Related Art

Since its inception, fibre channel speeds have steadily increased from around 1 gigabit per second up to around 8 gigabits per second for fibre channel and around 10 gigabits per second for fibre channel over Ethernet ("FCoE"). Many fibre channel networks, such as storage area networks ("SANs"), include a mixture of components, such as small form-factor pluggable ("SFP") transceivers, fibre cables, fibre connectors, and the like, with different speed capabilities operating within the same fibre channel network. These differences in speed capabilities can cause reliability issues. At times, slower components cannot keep up with faster components, causing the slower components to drop frames. Typically, to recover from dropped frames, error recovery is performed and corresponding commands are reissued. Similar issues exist for SANs using other network types.

In addition to speed mismatch problems, running legacy components at higher speeds pushes the components to their performance limits. At times, pushing an SFP to its speed limit can cause hundreds of errors per second. In an attempt to remedy the situation, some fibre channel switch vendors provide messages such as "slow draining device." These messages do not correct the problem but simply identify the problem to an end user. The messages also take up network bandwidth in the process.

BRIEF SUMMARY

From the foregoing discussion, it should be apparent that a need exists for a method, apparatus, system, and computer program product that manage storage area network paths. Beneficially, such a method, apparatus, system, and computer program product would adjust use of a storage area network path based on link incidents in the path.

The present invention has been developed in response to the present state of the art, and in particular, in response to the problems and needs in the art that have not yet been fully solved by currently available storage area networks. Accordingly, the present invention has been developed to provide a method, apparatus, system, and computer program product for storage area network path management that overcome many or all of the above-discussed shortcomings in the art.

An apparatus to manage storage area network paths is provided with a plurality of modules configured to functionally execute the necessary steps of storage area network path management. These modules in the described embodiments include a path selection module, a trace route module, a record registration module, an incident record module, a record correlation module, an incident count module, and a path change module.

In one embodiment, the path selection module selects several fibre channel paths between a fibre channel host and a fibre channel destination. The trace route module, in a further embodiment, performs one or more fibre channel trace route procedures for each of the several fibre channel paths. The trace route module, in one embodiment, provides a set of fibre channel links between the fibre channel host and the fibre channel destination for each selected fibre channel path.

In one embodiment, the record registration module registers with an event server to receive link incident records for fibre channel links in the sets of fibre channel links. The incident record module, in a further embodiment receives the link incident records from the event server. In one embodiment, the record correlation module matches the link incident records to fibre channel links in the sets of fibre channel links. In one embodiment, the incident count module determines one or more incident counts based on the matching link incident records.

In one embodiment, the path change module adjusts data communications between the fibre channel host and the fibre channel destination from one fibre channel path to another fibre channel path. The path change module, in a further embodiment, adjusts the data communications in response to an incident count meeting an incident threshold.

A method of the present invention is also presented for managing storage area network paths. The method in the disclosed embodiments substantially includes the steps necessary to carry out the functions presented above with respect to the operation of the described apparatus. In one embodiment, the method includes selecting storage area network paths between a storage area network host and a storage area network destination. The method, in a further embodiment, includes performing a storage area network trace route procedure for each of the storage area network paths to provide a set of storage area network links between the storage area network host and the storage area network destination for each of the fibre channel paths. In another embodiment, the method includes registering with one or more event servers to receive link incident records for the storage area network links in the sets of storage area network links.

A computer program product of the present invention is also presented for managing storage area network paths. The computer program product, in the disclosed embodiments, comprises a computer readable medium having computer readable program code executing to perform operations for managing fibre channel paths. The operations, in one embodiment, substantially include the steps necessary to carry out the functions presented above with respect to the operation of the described apparatus and method.

In one embodiment, the operations include selecting fibre channel paths between a fibre channel host and a fibre channel destination. The operations, in another embodiment, include performing one or more fibre channel trace route procedures for each of the fibre channel paths to provide a set of fibre channel links between the fibre channel host and the fibre channel destination for each of the fibre channel paths. In one embodiment, the operations include registering with one or more event servers to receive link incident records for the fibre channel links in the sets of fibre channel links.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
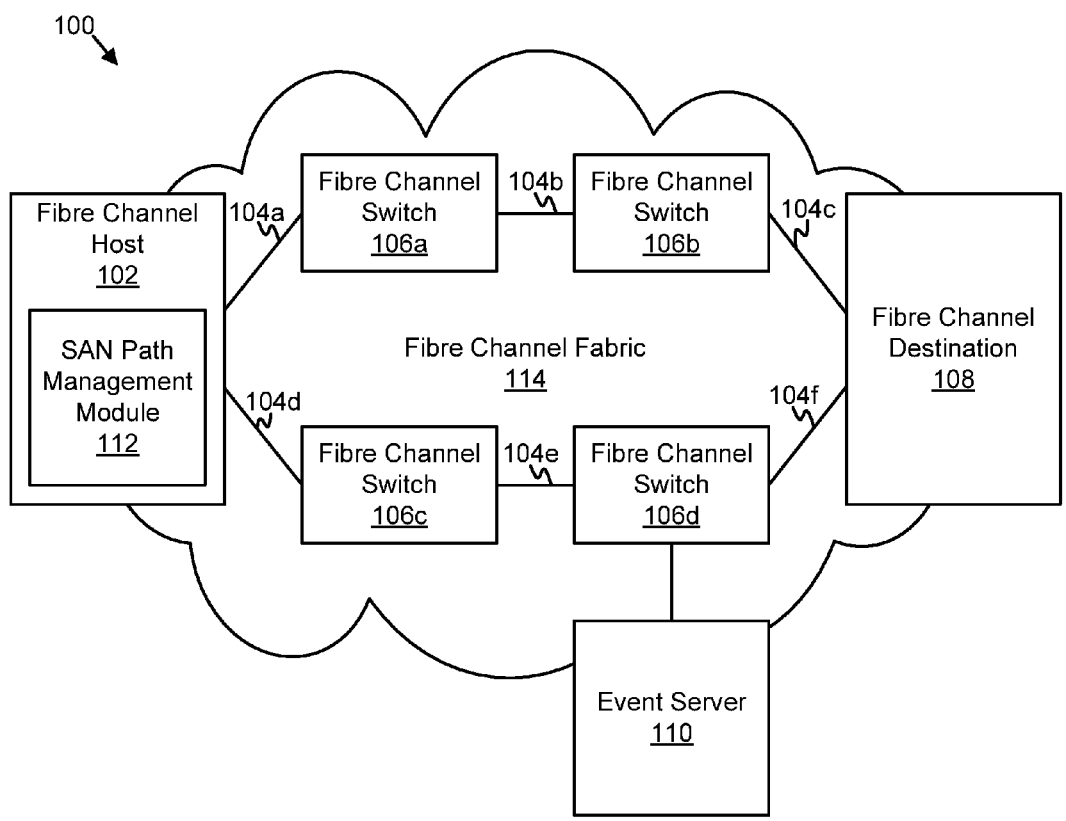
FIG. 1 is a schematic block diagram illustrating one embodiment of a system for storage area network path management in accordance with the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in microcode, firmware, or the like of programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fibre cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fibre optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. These computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

FIG. 1 depicts one embodiment of a system 100 for storage area network path management. In the depicted embodiment, the system 100 includes a fibre channel host 102, a group of fibre channel switches 106, a fibre channel destination 108, several fibre channel links 104 between the fibre channel host 102 and the fibre channel destination 108, and an event server 110. While the system 100, in the depicted embodiment, is embodied by a fibre channel storage area network, in other embodiments, the system 100 may include other storage area network types. Examples of storage area network types, in various embodiments, include fibre channel protocol ("FCP"), fibre channel over Ethernet ("FCOE"), AT attachment ("ATA") over Ethernet ("AoE"), enterprise systems connection ("ESCON") over Fibre Channel ("FICON"), serial attached ("SA") small computer system interface ("SCSI") ("SAS"), HyperSCSI, iSCSI, iSCSI extensions for remote direct memory access ("RDMA") ("iSER"), iFCP, SAN over Internet protocol ("IP") ("SANoIP"), and the like. While specific example embodiments are provided using fibre channel, one skilled in the art, in light of the present disclosure, will recognize that other storage area network types may be substituted for fibre channel in the example embodiments.

The system 100, in one embodiment, manages several storage area network paths between a storage area network host, such as the fibre channel host 102, and a storage area network destination, such as the fibre channel destination 108. In a further embodiment, the system 100 manages storage area network paths between a storage area network host and several different storage area network destinations. The system 100, in one embodiment, optimizes data communications between a storage area network host and a storage area network destination based on link incident records for storage area network links, such as fibre channel links 104, between a storage area network host and a storage area network destination.

The fibre channel host 102, in the depicted embodiment, is in communication with the fibre channel destination 108 through the fibre channel links 104 and the fibre channel switches 106. In one embodiment, the fibre channel host 102 is a host device with one or more Nx ports. An Nx port, in one embodiment, may include one or more virtual ports, such as VNx ports or the like. In various embodiments, the fibre channel host 102 may include a blade server, a desktop computer, or another computing device with a fibre channel host bus adapter. The fibre channel host 102, in one embodiment, includes one or more fibre channel host bus adapters. Each fibre channel host bus adapter, in one embodiment, includes one or more fibre channel Nx ports that connect the fibre channel host 102 to the fibre channel switches 106 through the fibre channel links 104. In other embodiments, the system 100 may include a host for another type of storage area network.

In one embodiment, the fibre channel links 104 extend between fibre channel ports to provide data communications between the fibre channel host 102 and the fibre channel destination 108. A fibre channel link 104, in one embodiment, includes an optical or electrical data connection between two fibre channel ports. For example, in various embodiments, a fibre channel link 104 may include fiber optic connections, twisted pair copper wire connections, and/or other fibre channel data connections. The fibre channel links 104, in various embodiments, may include interswitch links between the fibre channel switches 106, edge links between the fibre channel host 102 and the fibre channel switches 106, edge links between the fibre channel destination 108 and the fibre channel switches 106, back end links, links between a fibre channel switch 106 and a fibre channel router, and/or other fibre channel links. In other embodiments, the system 100 may include links of another type of storage area network.

A fibre channel switch 106, in one embodiment, includes a fibre channel hub, a fibre channel switching hub, a fibre channel switch, a fibre channel director, a fibre channel router, or the like that interconnects several fibre channel devices. In other embodiments, the system 100 may include switches for another type of storage area network. In one embodiment, the group of fibre channel switches 106 provides an interconnection framework between the fibre channel host 102 and the fibre channel destination 108. The fibre channel switches 106, the fibre channel links 104, and the Nx ports of the fibre channel host 102, the fibre channel destination 108, the event server 110, and/or other connected fibre channel devices, in one embodiment, form a fibre channel fabric 114. One or more of the fibre channel host 102, the fibre channel destination 108, and the event server 110, in one embodiment, are at an edge of the fibre channel fabric 114.

The fibre channel switches 106, in one embodiment, provide several different fibre channel paths between the fibre channel host 102 and the fibre channel destination 108. In a further embodiment, the fibre channel switches 106 provide fibre channel paths between the fibre channel host 102 and one or more additional fibre channel destinations 108 (in addition to the depicted fibre channel destination 108). In another embodiment, the fibre channel host 102 may be connected to one or more additional fibre channel destinations 108 through one or more additional fibre channel fabrics 114 (in addition to the depicted fibre channel fabric 114). In one embodiment, a fibre channel fabric 114 may be a virtual fabric that includes several combined fibre channel fabrics 114.

Each fibre channel switch 106, in one embodiment, includes several fibre channel ports. A fibre channel port, as used herein, includes virtual fibre channel ports. A fibre channel switch 106, in one embodiment, may include one or more F ports, Fx ports, VF ports, or the like for connecting to Nx ports (and/or VNx ports) of edge fibre channel devices; one or more E ports, EX ports, TE ports, or the like for connecting to another fibre channel switch 106; one or more VE port, VEX ports, or the like to connect multiple fibre channel fabrics; one or more auto-sensing ports, generic ports, universal ports, or the like that may be connected to either an edge fibre channel device or another fibre channel switch 106; and/or one or more other fibre channel ports.

One or more of the fibre channel switches 106, in one embodiment, provide one or more fibre channel services, such as extended link services, generic services, switch link services, processing fibre channel trace route procedures, sending event notifications, sending link incident records, and/or other fibre channel services. In one embodiment, several fibre channel switches 106 provide fibre channel services. In another embodiment, one or more designated fibre channel switches 106 provide fibre channel service. In a further embodiment, the event server 110, a management server, or the like provides one or more fibre channel services.

The fibre channel destination 108, in the depicted embodiment, is in communication with the fibre channel host 102 through the fibre channel links 104 and the fibre channel switches 106. In one embodiment, the fibre channel destination 108 is a fibre channel device with one or more Nx ports, VNx ports, or the like. For example, in various embodiments, the fibre channel host 102 may include a storage device, a blade server, a desktop computer, or another fibre channel device. The fibre channel destination 108, in one embodiment, includes one or more fibre channel host bus adapters. Each fibre channel host bus adapter, in one embodiment, includes one or more fibre channel Nx ports (and/or VNx ports) that connect the fibre channel destination 108 to the fibre channel switches 106 through the fibre channel links 104.

In one embodiment, the fibre channel destination 108 includes one or more data storage devices, such as hard disk drives, solid-state drives ("SSDs"), tape storage drives, optical storage drives, and/or other data storage devices, and the fibre channel fabric 114 comprises a storage area network. For example, in various embodiments, the fibre channel destination 108 may include one or more disk arrays, tape libraries, optical jukeboxes, discrete data storage devices, and/or other data storage devices that are accessible to the fibre channel host 102 over the fibre channel fabric 114.

In one embodiment, the event server 110 provides event notifications to fibre channel devices, such as the fibre channel host 102, that register for notifications with the event server 110. The event server 110, in a further embodiment, provides link incident records for the fibre channel links 104 to fibre channel devices, such as the fibre channel host 102, that register with the event server 110 to receive link incident records. In one embodiment, the event server 110 supports and/or provides the link incident record registration ("LIRR") extended link service. The event server 110, in one embodiment, provides a link incident record in response to a link incident in a fibre channel link 104 in the fibre channel fabric 114.

A link incident, in one embodiment, may include a broken fibre channel link 104, an intermittent fibre channel link 104, a failed fibre channel link 104, a loss of signal on a fibre channel link 104, a loss of synchronization for a fibre channel link 104, a fibre channel link 104 exceeding a bit-error-rate threshold, a link reset protocol timeout, a primitive sequence timeout, an invalid primitive sequence for a port state, a not operational primitive sequence ("NOS"), a loop initialization timeout, a loop initialization primitive sequence ("LIP") indicating a loss-of signal condition, an implicit incident detected by a fibre channel port, or the like. A link incident record, in various embodiments, may include an incident port name, an incident port node name, an incident port type, a connected port name, a connected port node name, a fabric name, an incident port number, a transaction identifier, a time stamp, a time stamp format, an incident qualifier, an incident code describing or defining an incident, and/or other information of an incident.

In one embodiment, the event server 110 is integrated with a fibre channel switch 106. In another embodiment, the event server 110 includes a management server for the fibre channel fabric 114. In a further embodiment, the event server 110 is a fibre channel device with an Nx port, connected to the fibre channel fabric 114. The event server 110, in one embodiment, may be substantially similar to the fibre channel host 102 described above. In one embodiment, the event server 110 has a well known address, such as an address of FF FF F4h, a well known Nx port name, or another well known address.

The fibre channel switches 106, Nx ports connected to the fibre channel fabric 114, and/or other fibre channel ports of the fibre channel fabric 114, in one embodiment, report link incidents for the fibre channel links 104 to the event server 110. In a further embodiment, the fibre channel switches 106, Nx ports connected to the fibre channel fabric 114, and/or other fibre channel ports of the fibre channel fabric 114 send link incident reports for the fibre channel links 104 directly to a fibre channel port, such as an Nx port of the fibre channel host 102, that is registered for link incident records. In various embodiment, a fibre channel device, such as the fibre channel host 102 and/or an Nx port of the fibre channel host 102, may register with the event server 110 to receive link incident reports for each fibre channel link 104 in the fibre channel fabric 114, for a subset of fibre channel links 104 in the fibre channel fabric 114 (such as just the fibre channel links 114 in paths between the fibre channel host 102 and the fibre channel destination 108), and/or for another grouping of fibre channel links 104.

In the depicted embodiment, the fibre channel host 102 includes a storage area network path management module 112. The storage area network path management module 112, in general, manages storage area network paths between a storage area network host and a storage area network destination. In the depicted embodiment, the storage area network path management module 112 manages fibre channel paths between the fibre channel host 102 and the fibre channel destination 108. In a further embodiment, the storage area network path management module 112 manages fibre channel paths between the fibre channel host 102 and a plurality of fibre channel destinations 108. The storage area network path management module 112 is described in greater detail below with regard to FIG. 2 and FIG. 3.

The storage area network path management module 112, in one embodiment, includes executable instructions stored on a computer-readable storage medium and/or hardware logic of a host bus adapter of a storage area network host, such as the fibre channel host 102. In a further embodiment, the storage area network path management module 112 includes executable instructions stored on a computer-readable storage medium of a storage area network host, such as a device driver or other software executable by the storage area network host.

In one embodiment, the storage area network path management module 112 detects and/or selects several storage area network paths between a storage area network host, such as the fibre channel host 102, and a storage area network destination, such as the fibre channel destination 108. In the depicted embodiment, the fibre channel fabric 114 provides two different fibre channel paths between the fibre channel host 102 and the fibre channel destination 108. In one embodiment, the storage area network path management module 112 selects each of the two different fibre channel paths between the fibre channel host 102 and the fibre channel destination 108.

The first fibre channel path between the fibre channel host 102 and the fibre channel destination 108, in the depicted embodiment, includes a first fibre channel link 104a between the fibre channel host 102 and a first fibre channel switch 106a, a second fibre channel link 104b between the first fibre channel switch 106a and a second fibre channel switch 106b, and a third fibre channel link 104c between the second fibre channel switch 106b and the fibre channel destination 108. The second fibre channel path between the fibre channel host 102 and the fibre channel destination 108, in the depicted embodiment, includes a fourth fibre channel link 104d between the fibre channel host 102 and a third fibre channel switch 106c, a fifth fibre channel link 104e between the third fibre channel switch 106c and a fourth fibre channel switch 106d, and a sixth fibre channel link 104f between the fourth fibre channel switch 106d and the fibre channel destination 108. The storage area network path management module 112, in one embodiment, selects the first fibre channel path and/or the second fibre channel path by the Nx ports of the fibre channel host 102 that are connected to the fibre channel paths.

In a further embodiment, the storage area network path management module 112 maps individual links along the selected fibre channel paths between the fibre channel host 102 and the fibre channel destination 108, using one or more fibre channel trace route procedures or the like. The storage area network path management module 112, in one embodiment, registers with the event server 110 (and/or with one or more other event servers) to receive link incident records for the fibre channel links 104 from selected fibre channel paths between the fibre channel host 102 and the fibre channel destination 108.

In one embodiment, the storage area network path management module 112 receives link incident records from the event server 110 (and/or from one or more other event servers) and matches link incident records to fibre channel links 104 in the selected fibre channel paths between the fibre channel host 102 and the fibre channel destination 108. In a further embodiment, the storage area network path management module 112 adjusts data communications from the fibre channel host 102 among fibre channel paths to the fibre channel destination 108 in response to a link incident count meeting an incident threshold. By mapping out several fibre channel paths between the fibre channel host 102 and the fibre channel destination 108 and monitoring link incident records for the fibre channel paths, in one embodiment, the storage area network path management module 112 selects an optimal use of fibre channel paths for data communications between the fibre channel host 102 and the fibre channel destination 108.

Figure 2:
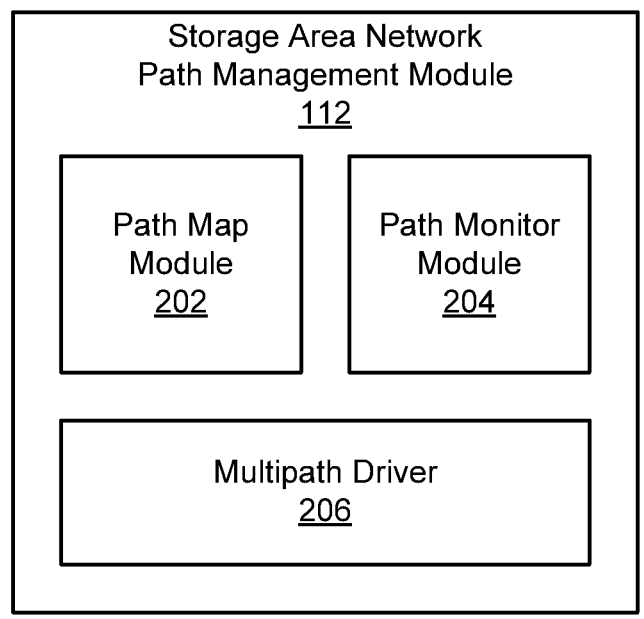
FIG. 2 is a schematic block diagram illustrating one embodiment of a storage area network path management module in accordance with the present invention.

FIG. 2 depicts one embodiment of the storage area network path management module 112. In the depicted embodiment, the storage area network path management module 112 includes a path map module 202, a path monitor module 204, and a multipath driver 206. In one embodiment, the storage area network path management module 112 depicted in FIG. 2 is substantially similar to the storage area network path management module 112 described above with regard to FIG. 1.

In general, the path map module 202 selects and maps several storage area network paths (for example, fibre channel paths) between a storage area network host, such as the fibre channel host 102, and a storage area network destination, such as the fibre channel destination 108. The path map module 202, in one embodiment, selects different fibre channel paths based on corresponding Nx ports of the fibre channel host 102 that are connected at an end of the fibre channel paths. In a further embodiment, the path map module 202 selects storage area network paths based on input from the multipath driver 206.

Upon selecting several different storage area network paths between the storage area network host and the storage area network destination, in one embodiment, the path map module maps the selected storage area network paths, using one or more storage area network trace route procedures or the like, to discover the storage area network links, such as the fibre channel links 104, that are in the selected storage area network paths. The path map module 202, in one embodiment, registers with one or more event servers to receive link incident records for the discovered storage area network links. In one embodiment, the path map module 202 selects and maps the storage area network paths and registers for link incident records in response to an initialization event, such as a change in paths between a storage area network host and a storage area network destination, or the like.

In one embodiment, the path map module 202 repeats the process of selecting and mapping storage area network paths and registering for link incident records one or more times for additional storage area network destinations with which the storage area network host communicates. A further embodiment of the path map module 202 is described in greater detail below with regard to FIG. 3A.

In general, the path monitor module 204 monitors selected storage area network paths (and associated storage area network links) between the storage area network host and the storage area network destination for link incidents and/or other errors. In one embodiment, the path monitor module 204 receives link incident records from the one or more event servers with which the path map module 202 registered and matches link incident records to storage area network links in the selected storage area network paths. In a further embodiment, the path monitor module 204 adjusts the storage area network paths that the storage area network host uses for data communications with the storage area network destination in response to a link incident count meeting an incident threshold. The path monitor module 204, in one embodiment, adjusts the storage area network paths that the storage area network host uses for data communications by issuing a command to the multipath driver 206. A further embodiment of the path monitor module 204 is described in greater detail below with regard to FIG. 3B.

The multipath driver 206, in one embodiment, is a software driver of a storage area network host, such as the fibre channel host 102, that supports multiple input and output communication channels such as multiple storage area network paths, multiple fibre channel paths, and/or the like. The multipath driver 206, in various embodiments, is in communication with, includes, is integrated with, and/or otherwise cooperates with one or more host bus adapter drivers of the storage area network host that allow the storage area network host to interact with one or more storage area network host bus adapters. In one embodiment, the multipath driver 206 adjusts data communications between the storage area network host and a storage area network destination among several storage area network paths. The multipath driver 206, in one embodiment, follows a multipath policy. Examples of multipath policies, in various embodiments, include failover policies, failback policies, round-robin policies, load balancing policies, weighted path policies, and the like. In certain embodiments, the multipath driver 206 may prioritize storage area network paths, designating available storage area network paths as one or more primary paths, secondary paths, tertiary paths, standby paths, and/or the like.

The multipath driver 206, in one embodiment, includes an interface, such as an application program interface ("API"), a command line interface, a script interface, a remote procedure call ("RPC") interface, and/or another interface, through which the multipath driver 206 receives commands or requests to adjust the use of a storage area network path for data communications. For example, the multipath driver 206, in various embodiments, may support commands for changing a designation of one or more storage area network paths, to trigger failover or failback, to adjust a weight of a storage area network path, or the like. Support for a command that changes or adjusts storage area network paths, in one embodiment, is an updated feature that the multipath driver 206 that may not be supported by standard multipath drivers. In one embodiment, the path monitor module 204 sends a command or request to the multipath driver 206 to adjust data communications for one or more storage area network paths between the storage area network host and a storage area network destination.

Figure 3A:
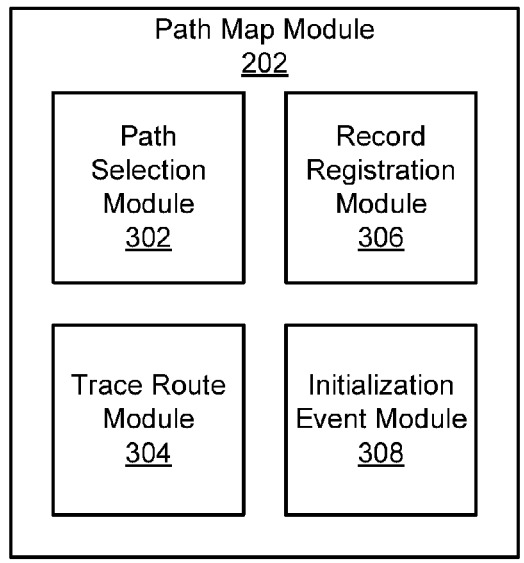
FIG. 3A is a schematic block diagram illustrating one embodiment of a path map module in accordance with the present invention.

FIG. 3A depicts one embodiment of the path map module 202. In the depicted embodiment, the path map module 202 includes a path selection module 302, a trace route module 304, a record registration module 306, and an initiation event module 308. In one embodiment, the path map module 202 is substantially similar to the path map module 202 described above with regard to FIG. 2.

In one embodiment, the path selection module 302 selects at least two storage area network paths between a storage area network host and a storage area network destination. In a further embodiment, the path selection module 302 selects at least two fibre channel paths between the fibre channel host 102 and the fibre channel destination 108. The path selection module 302, in one embodiment, selects additional storage area network paths between the storage area network host and one or more additional storage area network destinations.

Each of the at least two storage area network paths, in one embodiment, includes a fibre channel path that extends between an Nx port of the fibre channel host 102 and an Nx port of a fibre channel destination 108. The path selection module 302, in one embodiment, selects fibre channel paths based on Nx ports of the fibre channel host 102 and on one or more fibre channel destinations 108 in communication with the Nx ports. In a further embodiment, the path selection module 302 receives a selection of storage area network paths from the multipath driver 206, another module, or the like.

In one embodiment, the trace route module 304 performs one or more storage area network trace route procedure for each of the at least two storage area network paths between a storage area network host, such as the fibre channel host 102, and a storage area network destination, such as the fibre channel destination 108. In a further embodiment, the trace route module 304 performs storage area network trace route procedures for storage area network paths between the storage area network host and one or more additional storage area network destinations.

The one or more storage area network trace route procedures, in one embodiment, provide a set of storage area network links, such as the fibre channel links 104, between the storage area network host and a storage area network destination along a storage area network path, such as a fibre channel path or the like. In one embodiment, the trace route module 304 performs a separate storage area network trace route procedure for each storage area network link in a storage area network path and combines the results of the separate trace route procedures to form a set of storage area network links. In a further embodiment, the trace route module 304 performs a single storage area network trace route procedure for an entire storage area network path that provides a set of storage area network links for the storage area network path. The trace route module 304, in one embodiment, maintains one or more link data structures populated with one or more sets of storage area network links. A link data structure, in various embodiments, may include a table, an array, a list, a tree, a hash, a graph, and/or another data structure capable of storing one or more sets of storage area network links.

The one or more fibre channel trace route procedures, or another type of storage area network trace route procedure, in one embodiment, provide a set of fibre channel links 104 as a set of fibre channel port identifiers of fibre channel ports between the fibre channel host 102 and a fibre channel destination 108, such as identifiers for one or more Nx ports, VNx ports, F ports, Fx ports, VFx ports, E ports, EX ports, TE ports, VE port, VEX ports, and/or other fibre channel ports. One example of a fibre channel port identifier is a fibre channel identifier ("FCID"), which a fibre channel switch 106 assigns to a fibre channel port. In one embodiment, an FCID includes one or more of a Domain_ID, an Area_ID, a Port_ID, and/or another fibre channel identifier. Another example of a fibre channel port identifier is a port world wide name ("WWN") assigned to a fibre channel port. In a further embodiment, a fibre channel trace route procedure provides a set of fibre channel links 104 as a set of identifiers for fibre channel switches 106, or the like. In another embodiment, a fibre channel trace route procedure provides a set of fibre channel links 104 as a combination of fibre channel port identifiers, fibre channel switch identifiers, and/or other fibre channel device identifiers. In another embodiment, a fibre channel trace route procedure provides a latency, a timestamp, and/or other information associated with each fibre channel link.

In one embodiment, the trace route module 304 issues a fibre channel trace route command from the fibre channel host 102 to a fibre channel switch 106 to perform a fibre channel trace route procedure. The fibre channel switch 106 that the trace route module 304 issues a fibre channel trace route command to, in one embodiment, is a management server, a fibre channel fabric manager, a primary fibre channel switch 106, or the like. In another embodiment, the trace route module 304 issues a fibre channel trace route command from the fibre channel host 102 to a fibre channel destination 108. In one embodiment, several fibre channel switches 106 cooperate to fulfill a fibre channel trace route command for the trace route module 304.

One embodiment of a fibre channel trace route command is the FC Traceroute command of "fctrace." In one embodiment, the trace route module 304 invokes the fibre channel trace route command by providing an FCID, a port WWN, a device alias, or another identifier of a fibre channel destination 108. The trace route module 304, in one embodiment, issues a fibre channel trace route command from an Nx port of the fibre channel host 102. A frame associated with the fibre channel trace route command, in one embodiment, travels from the issuing port to the fibre channel destination 108 at the edge of the fibre channel fabric 114, where the fibre channel destination 108 loops the frame back to the issuing port of the fibre channel host 102. The trace route module 304, in one embodiment, uses a fibre channel trace route command that may be issued from an Nx port, such as an Nx port of the fibre channel host 102, not exclusively from a fibre channel switch 106. Support for a fibre channel trace route command issued from an Nx port, in one embodiment, is an updated feature that the trace route module 304 that may not be supported by a standard fibre channel trace route command.

In one embodiment, the record registration module 306 registers with one or more event servers 110 to receive link incident records for storage area network links discovered by the trace route module 304. As described above with regard to the event server 110 of FIG. 1, an event server, in various embodiments, may include and/or be integrated with a management server, a fibre channel switch 106, a fibre channel host 102, may be within a fibre channel fabric 114, may be behind an Nx port, or the like. In one embodiment, the record registration module 306 registers with a single event server 110 to receive link incident records for an entire fibre channel fabric 114, an entire storage area network, and/or the like. In a further embodiment, fibre channel ports in the fibre channel fabric 114 include individual event servers 110 and the record registration module 306 registers to receive link incident records from fibre channel ports directly. The record registration module 306, in one embodiment, registers with a different set of one or more event servers 110 for each fibre channel fabric 114 or other storage area network that includes a selected storage area network path.

The record registration module 306, in one embodiment, registers to receive link incident records from an event server 110 using the LIRR extended link service. In one embodiment, the record registration module 306 sends an event registration with an embedded LIRR payload to the event server 110. An LIRR, in one embodiment, includes a registered link incident report ("RLIR") command code. An LIRR, in a further embodiment, includes a registration function that specifies the mode of registration, such as conditionally receiving link incident records, always receiving link incident records, or the like. In another embodiment, an LIRR includes an LIRR type, such as a common format value indicating that common link incident records and link incident descriptors are reported, a specific coded value of the registration format being requested, or the like.

In one embodiment, the initiation event module 308 detects an initialization event. The path selection module 302, in one embodiment, begins selecting storage area network paths in response to the initiation event module 308 detecting an initialization event. In a further embodiment, the trace route module 304 performs the fibre channel trace route procedures and/or other storage area network trace route procedures and the record registration module registers with one or more event servers 110 in response to the initiation event module 308 detecting an initialization event. The initiation event module 308, in one embodiment, triggers one or more operations of the path map module 202 to map and/or remap storage area network paths between a storage area network host and a storage area network destination.

In one embodiment, a fibre channel switch 106 performs an initialization procedure in response to the addition of a new fibre channel switch 106 to the fibre channel fabric 114, a fibre channel switch failure, and/or another fibre channel state change. An initialization procedure of a fibre channel switch 106, in one embodiment, may change or otherwise affect one or more fibre channel paths between the fibre channel host 102 and the fibre channel destination 108. In other embodiments, other types of storage area network switches may perform similar initialization procedures.

In one embodiment, the initialization event includes a state change notification from a fibre channel switch 106, a fibre channel port, an event server 110, a different type of storage area network switch, or the like. The initialization event module 308, in one embodiment, registers with one or more fibre channel switches 106, fibre channel ports, event servers 110, storage area network switches, and/or the like to receive state change notifications for storage area network links, such as the fibre channel links 104, between a storage area network host and a storage area network destination. The state change notification, in one embodiment, comprises a registered state change notification ("RSCN"), or the like. The initialization event module 308, in one embodiment, registers for a state change notification using the State Change Registration ("SCR") fibre channel extended link service, or the like.

In another embodiment, the initialization event includes user input, such as a user command, a user selection, or the like associated with initializing operations of the path map module 202. For example, in one embodiment, the path map module 202 includes a user interface allowing a user to trigger an initialization event that the initialization event module 308 detects, or the like.

Figure 3B:
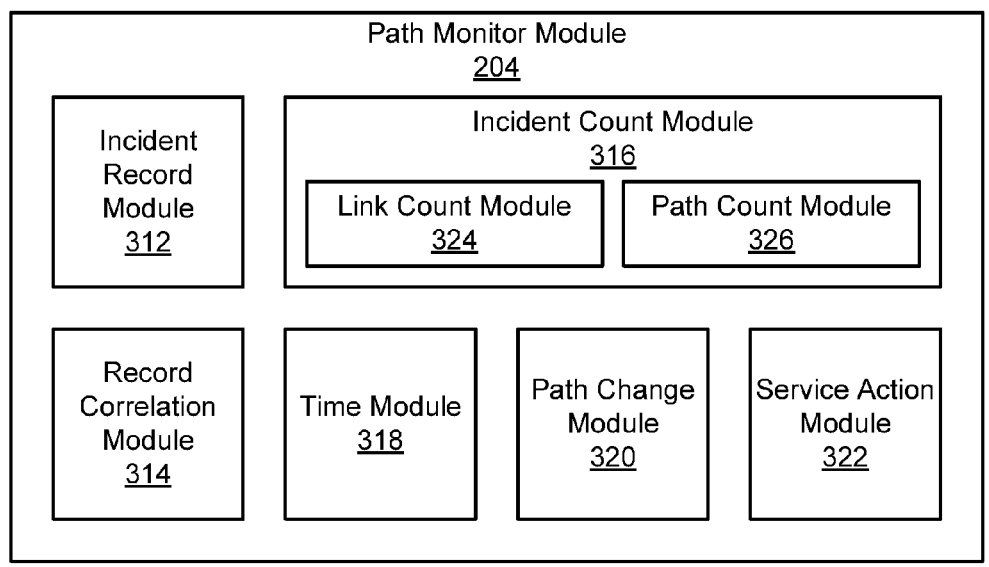
FIG. 3B is a schematic block diagram illustrating one embodiment of a path monitor module in accordance with the present invention.

FIG. 3B depicts one embodiment of the path monitor module 204. In the depicted embodiment, the path monitor module 204 includes an incident record module 312, a record correlation module 314, an incident count module 316, a time module 318, a path change module 320, and a service action module 322. In one embodiment, the path monitor module 204 is substantially similar to the path monitor module 204 described above with regard to FIG. 2. In general, the path monitor module 204 monitors storage area network links mapped by the path map module 202 for link incidents.

In one embodiment, the incident record module 312 receives link incident records from one or more event servers 110. The link incident records that the incident record module 312 receives, in one embodiment, include the link incident records that the record registration module 306 registered for, as described above with regard to FIG. 3A.

A link incident record, in various embodiments, may indicate a broken fibre channel link 104, an intermittent fibre channel link 104, a failed fibre channel link 104, a loss of signal on a fibre channel link 104, a loss of synchronization for a fibre channel link 104, a fibre channel link 104 exceeding a bit-error-rate threshold, a link reset protocol timeout, a primitive sequence timeout, an invalid primitive sequence for a port state, an NOS, a loop initialization timeout, a LIP indicating a loss-of signal condition, an implicit incident detected by a fibre channel port, and/or another link incident. A link incident record, in one embodiment, includes information of a link incident. For example, in various embodiments, a link incident record may include an incident port name, an incident port node name, an incident port type, a connected port name, a connected port node name, a fabric name, an incident port number, a transaction identifier, a time stamp, a time stamp format, an incident qualifier, an incident code describing or defining an incident, and/or other information of an incident.

In one embodiment, the record correlation module 314 correlates and/or matches one or more of the link incident records that the incident record module 312 receives to storage area network links, such as the fibre channel links 104 in the sets of storage area network links provided by the trace route module 304. The record correlation module 304, in one embodiment, matches a link incident record to a storage area network link using information of an incident from the link incident record. For example, in various embodiments, the record correlation module 314 may use an indicator for the fibre channel link 104, an incident port name for a port of the fibre channel link 104, an incident port node name for a node of a port of the fibre channel link 104, an incident port type for a port of the fibre channel link 104, a connected port name for a port of the fibre channel link 104, a connected port node name for a node of a port of the fibre channel link 104, a fabric name for a fibre channel fabric 114 of the fibre channel link 104, an incident port number of a port of the fibre channel link 104, and/or other information of a link incident record. The record correlation module 314, in a further embodiment, may use similar information to match link incident records to storage area network links in a type of storage area network other than fibre channel.

In one embodiment, the record correlation module 314 locates a predefined storage area network link indicator, such as the information of a link incident record described above, in a link incident record. In a further embodiment, the record correlation module 314 traverses a link data structure, maintained by the trace route module 304 or the like, to match a predefined storage area network link indicator to a storage area network link from the link data structure.

In one embodiment, the incident count module 316 determines one or more incident counts based on matching link incident records correlated by the record correlation module 314. The incident count module 316, in one embodiment, determines separate counts based on different characteristics and/or categories, such as for different types of link incidents, for each storage area network link, for each storage area network path, and/or for other characteristics.

In the depicted embodiment, the incident count module 316 includes a link count module 324 and a path count module 326. Other embodiments may include a link count module 324 without a path count module 326, a path count module 326 without a link count module, and/or another combination of modules. In one embodiment, the link count module 324 determines a separate incident count for each storage area network link, such as a fibre channel link 104, in the sets of storage area network links. The path count module 326, in one embodiment, determines a separate incident count for each fibre channel path, or other type of storage area network path, selected by the path selection module 302.

In one embodiment, the time module 318 tracks one or more predefined time periods for the incident count module 316 so that the incident count module 316 determines one or more incident counts relative to the one or more predefined time periods. The time module 318, in one embodiment, tracks at least one time period for each incident count that the incident count module 316 determines.

The time module 318, in one embodiment, periodically resets a timer for an incident count and the incident count module 316 resets the incident count. In a further embodiment, the time module 318 tracks a sliding window for an incident count, and the incident count module 316 determines how many link incidents occur within the sliding window (i.e. over a specified time period). In a further embodiment, the time module 318 tracks several predefined time periods for a single incident count, for example, tracking link incidents for a storage area network link over a minute, over an hour, and over a day, or for other sets of predefined time periods. In one embodiment, the one or more predefined time periods are user defined or selected.

In one embodiment, the path change module 320 adjusts data communications between a storage area network host, such as the fibre channel host 102, and a storage area network destination, such as the fibre channel destination 108, from one storage area network path to another storage area network path in response to an incident count from the incident count module 204 meeting an incident threshold. Adjusting data communications, in various embodiments, includes a partial adjustment, such as changing a ranking or designation for a storage area network path (i.e. from primary to secondary, from primary to standby, or the like) so that a portion of data communications change storage area network paths, a full adjustment that shifts all data communications from one storage area network path to a different storage area network path, and/or other adjustments to data communications.

The path change module 320, in one embodiment, issues a path adjustment command to a multipath driver 206 to adjust data communications from one storage area network path to another storage area network path. The path change module 320, in various embodiments, may send a path adjustment command to a multipath driver 206 as an API call, a command line interface command, execution of a script, an RPC command, triggering an event, or the like. A path adjustment command, in various embodiments, may change a designation of one or more storage area network paths, trigger failover or failback to a different storage area network path, adjust a weight of one or more storage area network paths, change a priority of one or more storage area network paths, or the like.

An incident threshold, in one embodiment, includes a predefined level of link incidents that the incident count module 316 counts. An incident threshold, in various embodiments, may be relative to a single storage area network link (i.e. an incident count of the link count module 324), an entire storage area network path (i.e. an incident count of the path count module 326), a predefined time period (i.e. a time period of the time module 318), and/or other factors. An incident threshold, in a further embodiment, may include a rule, a Boolean operation, or the like, defining a combined level of link incidents for several incident counts, setting an incident threshold relative to another incident count, or the like. For example, in one embodiment, an incident count may meet an incident threshold when the incident count is greater than another predefined incident count (i.e. one storage area network path has more link incidents than another storage area network path, or the like). An incident threshold, in one embodiment, is user defined. In a further embodiment, an incident threshold is a default value set by a manufacturer, programmer, or the like. Meeting an incident threshold, in various embodiments, may be defined as being greater than the incident threshold, less than the incident threshold, equal to the incident threshold, crossing the incident threshold, and/or having another predefined relationship with the incident threshold.

In one embodiment, the service action module 322 sends a service request to a storage area network service provider, such as a fibre channel service provider or the like, in response to an incident count from the incident count module 316 meeting an incident threshold. A storage area network service provider, in various embodiments, includes a storage area network administrator, a service department, a storage area network equipment provider, a storage area network engineer, or the like. The service action module 322, in various embodiments, may send a service request as an email, a telephone call, a text message, a predefined data packet communication, and/or another type of communication. The service request, in one embodiment, includes information of the incident count, the incident threshold, and/or other link incident information.

Figure 4:
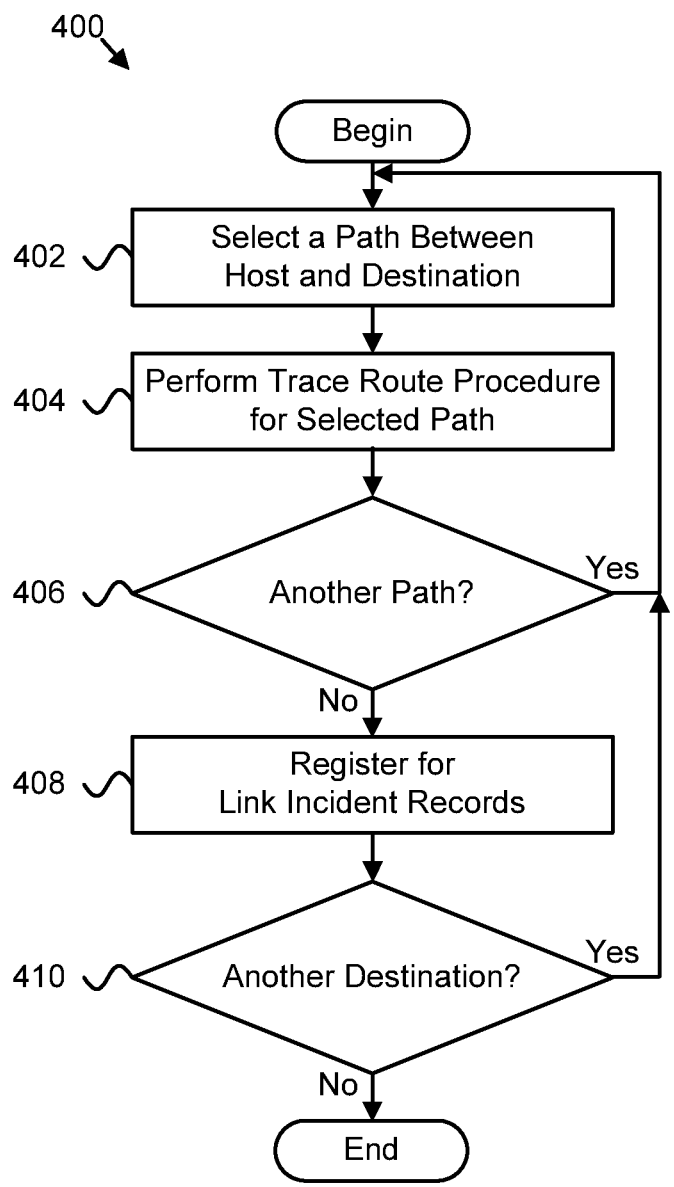
FIG. 4 is a schematic flow chart diagram illustrating one embodiment of a method for storage area network path management in accordance with the present invention.

FIG. 4 depicts one embodiment of a method 400 for storage area network path management. In the depicted embodiment, the method 400 begins and the path selection module 302 selects 402 a storage area network path between a storage area network host and a storage area network destination. The trace route module 304 performs 404 one or more storage area network trace route procedures for the selected storage area network path. In one embodiment, performing 404 the one or more storage area network trace route procedures provides the trace route module 304 with a set of storage area network links, such as the fibre channel links 104, for the selected storage area network path.

The path selection module 302 determines 406 whether to select an additional storage area network path between the storage area network host and the storage area network destination. In one embodiment, the path selection module 302 selects 402 each possible storage area network path between the storage area network host and the storage area network destination in turn. In a further embodiment, the path selection module 302 selects 402 a predefined number of storage area network paths between the storage area network host and the storage area network destination (i.e. two paths, three paths, or the like) even if additional storage area network paths exist. If the path selection module 302 determines 406 to select an additional storage area network path, in the depicted embodiment, the method 400 returns to the selecting step 402 and the path selection module 402 selects an additional storage area network path and the trace route module 404 performs 404 one or more additional storage area network trace route procedure for the additional storage area network path.

If the path selection module 302 determines 406 not to select an additional storage area network path, the record registration module 306 registers 408 with one or more event servers 110 to receive link incident records for storage area network links in sets of storage area network links from the one or more trace route procedures performed 404 by the trace route module 304 for the storage area network paths selected 402 by the path selection module 302. The path selection module 302 determines 410 whether or not to select storage area network paths for an additional storage area network destination. The determination 410 may be based on user input, based on detecting an additional storage area network destination, or the like. In one embodiment, the additional storage area network destination includes an additional fibre channel destination 108.

In the depicted embodiment, if the path selection module 302 determines 410 to select storage area network paths between the storage area network host and an additional storage area network destination, the method 400 returns to the selecting step 402 and the path selection module 402 selects a storage area network path for the additional storage area network destination, the trace route module 404 performs 404 one or more additional storage area network trace route procedures for the storage area network path, and the method 400 continues for the additional storage area network destination. If the path selection module 302 determines 410 not to select a storage area network path for an additional storage area network destination, the method 400 ends.

Figure 5:
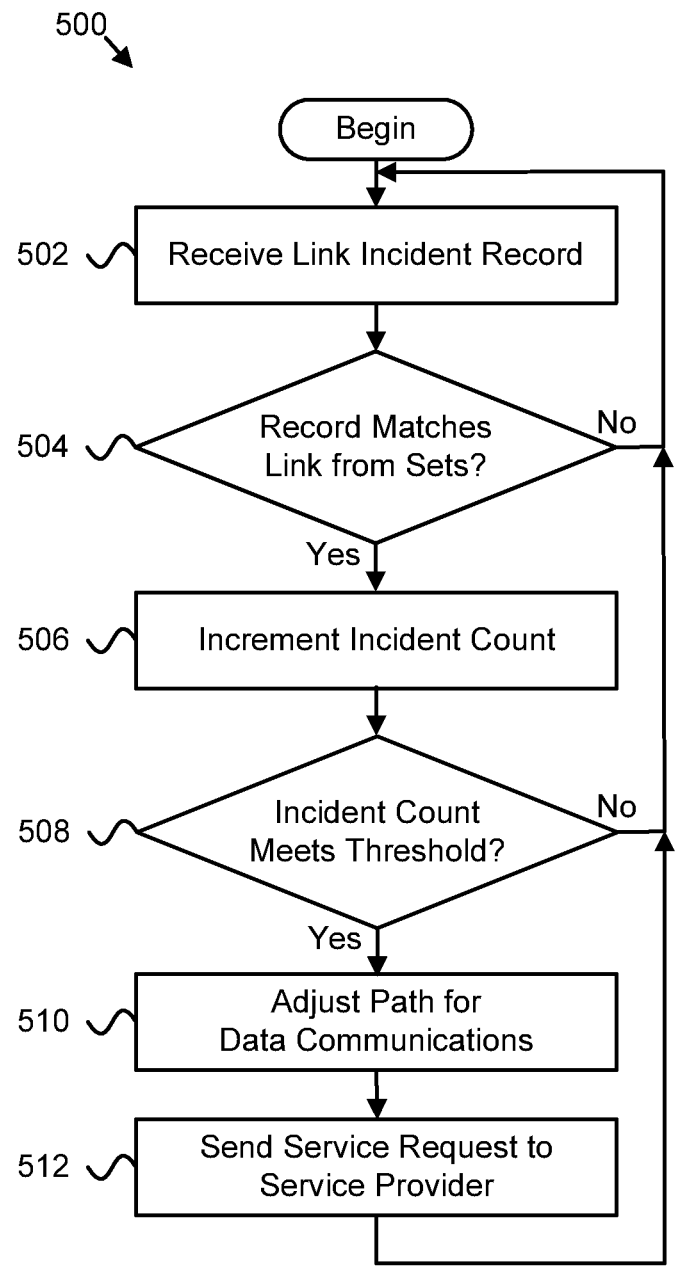
FIG. 5 is a schematic flow chart diagram illustrating another embodiment of a method for storage area network path management in accordance with the present invention.

FIG. 5 depicts another embodiment of a method 500 for storage area network path management. The method 500, in one embodiment, is performed in response to the method 400 described above with regard to FIG. 4. In the depicted embodiment, the incident record module 312 receives 502 a link incident record from an event server 110. The record correlation module 314 determines 504 whether the received link incident record matches a storage area network link in sets of storage area network links determined by the trace route module 304 for storage area network paths between a storage area network host and a storage area network destination.

In the depicted embodiment, if the record correlation module 314 determines 504 that the received link incident record matches a storage area network link from the sets of storage area network links, the incident count module 316 increments 506 one or more incident counts corresponding to the matched storage area network link. If the record correlation module 314 determines 504 that the received link incident does not match a storage area network link from the sets of storage area network links, the method 500 returns to the receiving step 502 until the incident record module 312 receives 502 a next link incident record.

The path change module 320, in the depicted embodiment, determines 508 whether a link incident count meets an incident threshold. If the path change module 320 determines 508 that a link incident count does not meet an incident threshold, in the depicted embodiment, the method 500 returns to the receiving step 502 until the incident record module 312 receives 502 a next link incident record. If the path change module 320 determines 508 that a link incident count does meet an incident threshold, in the depicted embodiment, the path change module 320 adjusts 510 data communications between the storage area network, such as the fibre channel host 102, and the storage area network destinations, such as the fibre channel destination 108, from one storage area network path to another storage area network path. The service action module 322, in the depicted embodiment, sends 512 a service request to a service provider and the method 500 returns to the receiving step 502 until the incident record module 312 receives 502 a next link incident record and the method 500 continues.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to manage storage area network paths, the apparatus comprising:
    an initialization event module that detects a path management initialization event, wherein the path management initialization event comprises one or more of an addition of a fibre channel switch, a fibre channel switch failure, or a fibre channel state change;
    a path selection module that selects a plurality of fibre channel paths between a fibre channel host and a fibre channel destination in response to a path management initialization event;
    a trace route module that performs one or more fibre channel trace route procedures for each of the plurality of fibre channel paths to provide a set of fibre channel links between the fibre channel host and the fibre channel destination for each of the plurality of fibre channel paths, wherein each fibre channel link of the set of fibre channel links comprises fibre channel port identifiers, fibre channel switch identifiers, and a latency of the fibre channel link;
    a record registration module that registers with a plurality of fibre channel ports to directly receive link incident records for the fibre channel links in the sets of fibre channel links;
    a record correlation module that matches the one or more of the link incident records to fibre channel links in the sets of fibre channel links;
    an incident count module that determines one or more incident counts based on the matching link incident records, the incident count module comprising a path count module that determines an incident count for each of the plurality of fibre channel paths;
    a path change module that adjusts data communications between the fibre channel host and the fibre channel destination from a first path of the plurality of fibre channel paths to a second path of the plurality of fibre channel paths in response to an incident count of the first path exceeding an incident threshold, wherein the path change module issues a path adjustment command to a multipath driver to adjust data communications, the multipath driver adjusting data communications based upon the latency of the fibre channel links between the fibre channel host and the fibre channel destination.

2. The apparatus of claim 1, wherein the one or more incident counts include a separate count of link incidents for each fibre channel link in the sets of fibre channel links.

3. The apparatus of claim 1, wherein the incident count module determines the one or more incident counts relative to one or more predefined time periods.

4. The apparatus of claim 1, further comprising a service action module that sends a service request to a fibre channel service provider in response to an incident count from the one or more incident counts meeting an incident threshold.

5. The apparatus of claim 1, wherein the path selection module selects the plurality of fibre channel paths in response to a state change notification from the fibre channel switch.

6. The apparatus of claim 1, wherein the trace route module issues fibre channel trace route commands from the fibre channel host to one or more fibre channel switches to perform the fibre channel trace route procedures.

7. The apparatus of claim 1, wherein each of the plurality of fibre channel paths extend between an Nx port of the fibre channel host and an Nx port of the fibre channel destination.

8. The apparatus of claim 1, wherein
the path selection module selects plurality of additional fibre channel paths between the fibre channel host and an additional fibre channel destination;
the trace route module performs an additional one or more fibre channel trace route procedures for each of the plurality of additional fibre channel paths to provide a set of additional fibre channel links for each of the plurality of additional fibre channel paths; and
the record registration module registers with another plurality of fibre channel ports to directly receive additional link incident records for the fibre channel links in the sets of additional fibre channel links.

9. The apparatus of claim 1, further comprising the fibre channel host, the fibre channel destination, and one or more fibre channel switches disposed between the fibre channel host and the fibre channel destination along the plurality of fibre channel paths.

10. A method for managing storage area network paths, the method comprising:
detecting a path management initialization event, wherein the path management initialization event comprises one or more of an addition of a fibre channel switch, a fibre channel switch failure, or a fibre channel state change;
selecting a plurality of storage area network paths between a storage area network host and a storage area network destination in response to a path management initialization event;
performing one or more storage area network trace route procedures for each of the plurality of storage area network paths to provide a set of storage area network links between the storage area network host and the storage area network destination for each of the plurality of storage area network paths, wherein
the plurality of storage area network paths comprise fibre channel paths between a fibre channel host and a fibre channel destination and the one or more storage area network trace route procedures comprise fibre channel trace route procedures; and
each storage area network link of the set of storage area network links comprises fibre channel port identifiers, fibre channel switch identifiers, and a latency of the storage area network link;
registering with a plurality of fibre channel ports to directly receive link incident records for the fibre channel links in the sets of fibre channel links;
matching the one or more of the link incident records to storage area network links in the sets of storage area network links;
determining one or more incident counts based on the matching link incident records, wherein determining the one or more incident links comprises determining an incident count for each of the plurality of fibre channel paths; and
adjusting data communications between the storage area network host and the storage area network destination from a first path of the plurality of fibre channel paths to a second path of the plurality of fibre channel paths in response to an incident count of the first path exceeding an incident threshold,
wherein adjusting data communications between the storage area network host and the storage area network destination comprises issuing a path adjustment command to a multipath driver to adjust data communications, the multipath driver adjusting data communications based upon the latency of the storage area network links between the storage area network host and the storage area network destination.

11. A computer program product comprising a non-transitory computer readable medium having computer readable program code executing to perform operations for managing storage area network paths, the operations of the computer program product comprising:
detecting a path management initialization event, wherein the path management initialization event comprises one or more of an addition of a fibre channel switch, a fibre channel switch failure, or a fibre channel state change;
selecting a plurality of fibre channel paths between a fibre channel host and a fibre channel destination in response to a path management initialization event;
performing one or more fibre channel trace route procedures for each of the plurality of fibre channel paths to provide a set of fibre channel links between the fibre channel host and the fibre channel destination for each of the plurality of fibre channel paths, wherein each fibre channel link of the set of fibre channel links comprises fibre channel port identifiers, fibre channel switch identifiers, and a latency of the fibre channel link;
registering with a plurality of fibre channel ports to directly receive link incident records for the fibre channel links in the sets of fibre channel links;
matching one or more of the link incident records to a fibre channel link in the set of fibre channel links;
determining one or more incident counts based on the matching link incident records, wherein determining the one or more incident links comprises determining an incident count for each of the plurality of fibre channel paths; and
adjusting data communications between the storage area network host and the storage area network destination from a first path of the plurality of fibre channel paths to a second path of the plurality of fibre channel paths in response to an incident count of the first path exceeding an incident threshold,
wherein adjusting data communications between the fibre channel host and the fibre channel destination comprises issuing a path adjustment command to a multipath driver to adjust data communications, the multipath driver adjusting data communications based upon the latency of the fibre channel links between the fibre channel host and the fibre channel destination.

* * * * *